(Model.)
E. NORTON.
SHEET METAL CAN CAP, HEAD, OR BLANK.
No. 364,662. Patented June 14, 1887.
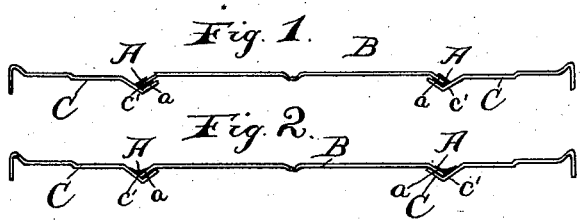
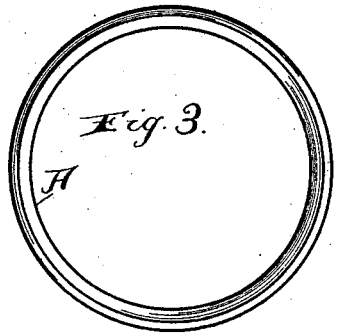
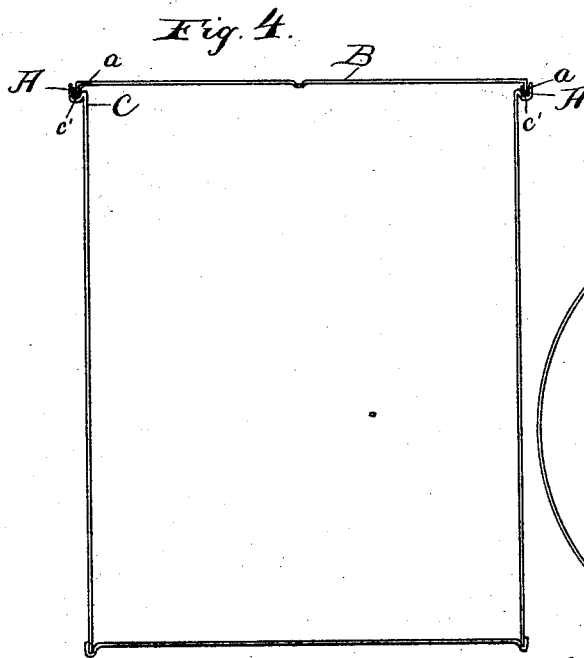
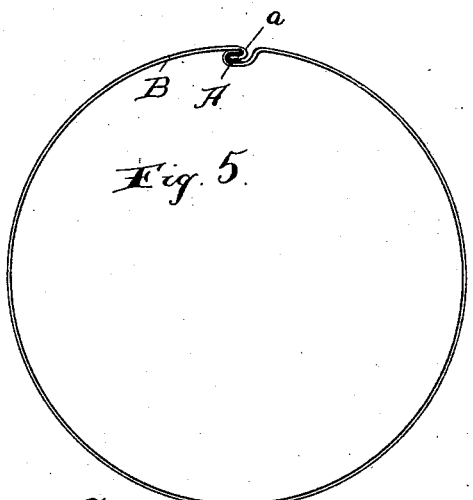
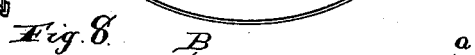
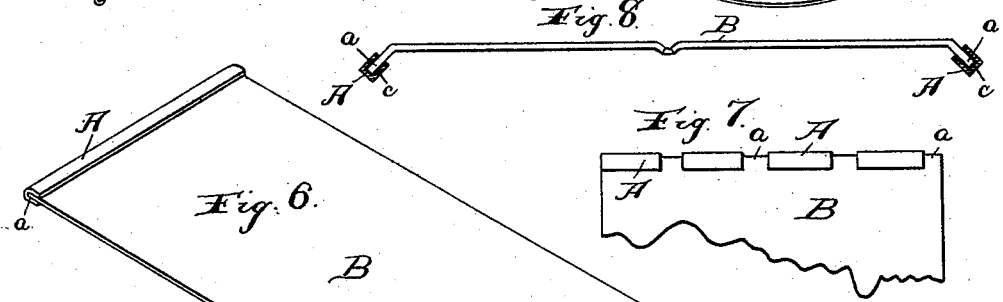
Witnesses:
Lew. C. Curtis.
H. M. Munday.
Inventor:
Edwin Norton
per Munday Evarts & Adcock
his Attorneys.

UNITED STATES PATENT OFFICE.

EDWIN NORTON, OF CHICAGO, ILLINOIS, ASSIGNOR TO HIMSELF AND OLIVER W. NORTON, OF SAME PLACE.

SHEET-METAL CAN CAP, HEAD, OR BLANK.

SPECIFICATION forming part of Letters Patent No. 364,662, dated June 14, 1887.

Application filed January 3, 1887. Serial No. 223,596. (Model.)

*To all whom it may concern:*

Be it known that I, EDWIN NORTON, a citizen of the United States, residing in Chicago, in the county of Cook and State of Illinois, have invented a new and useful Improvement in Sheet-Metal Can Caps, Heads, or Blanks and the Art of Soldering the Same, of which the following is a specification.

My invention relates to sheet-metal cans.

It consists in a cap, head, or other sheet having a thin strip of solder secured at or near its edge, and preferably folded over the same, for soldering such part to an adjoining part or sheet. By folding the band or strip of solder over the raw edge of the cap or sheet such edge is protected from rusting, so that the caps may be made and kept on hand any desired length of time before filling the cans without danger of injury.

As the solder is, in my invention, applied to the seam in the form of a thin ribbon or strip, and preferably in a continuous ribbon or strip, the solder is evenly distributed from one end of the seam to the other before the solder is melted or the heat is applied, and for this reason the seam may be much more quickly and expeditiously soldered, and for the same reason no more solder need be used than will just suffice to unite the parts of the seam together, thus occasioning a great saving in the amount of solder used. Owing, also, to the thin-strip form of the solder and its even distribution over the seam, much less heat is required to melt the solder and properly solder the seam, so that there is no danger of scorching or injuring the contents of the can, as heretofore has frequently been done, especially in canning certain kinds of articles—such as corn or milk, for example. At the same time the edge of the sheet is hemmed with the thin strip of solder. A flux—such, for example, as melted or powdered rosin—may also be applied.

In the accompanying drawings, which form a part of this specification, Figure 1 is a cross-section of a can-head and can-cap embodying my invention. Fig. 2 is a similar view of the same after the seam is soldered. Fig. 3 is a detail plan view of the strip or ring of solder before it is folded over the edge of the can-cap. Fig. 4 shows the invention as applied to the head of a can. Fig. 5 is a cross-section of a can, showing the invention as applied to the side seam; and Fig. 6 is a perspective view of a sheet having a solder-hemmed edge. Fig. 7 shows a modification, in that the solder strip is not continuous; and Fig. 8 is an enlarged cross-section, in which the flux is also roughly indicated.

Similar letters of reference indicate like parts in all the figures.

In the drawings, A is a thin strip or film of solder, preferably about one sixty-fourth of an inch thick and from one-eighth to three-sixteenths of an inch wide, folded over the edge *a* of the cap, head, or sheet B, which is to be soldered to an adjoining part, C, of the can. Where the edge *a* is of a circular form, as in a can-head or can-cap, the solder strip A is preferably cut in the form of an annulus or ring; but where the edge *a* is straight, as in Figs. 5 and 6, the solder strip may be also straight.

It is preferable to make the solder strip continuous, or about continuous; but it may also be applied only at intervals, as indicated in Fig. 7, in which case, however, the strip will be made correspondingly thicker or wider, in order to afford the required amount of solder.

The strip or film of solder may be applied to the edge of the sheet in any suitable way. One good way is to take a thin sheet of solder, and cut or stamp therefrom strips or rings of the desired width, and then fold such strips or rings over the edge of the sheet, thus securing the solder strip to the sheet or cap, so that the same may be handled or manipulated without disengaging the solder strip therefrom.

*c* represents the flux. It may be applied before or at the time the solder strip is folded over the edge of the sheet. The flux may be first applied to the edge of the sheet by dipping the same in a bath of melted rosin, for example; or powdered rosin may be discharged upon the solder strip as it is being folded over the edge of the sheet.

Instead of folding the solder strip over the edge of the sheet, as indicated in Figs. 1, 4, 5, and 6, the solder strip may be seated in the groove or seat *c'* of the part C, to which the edge *a* is to be soldered, as an equivalent construction.

Can-caps having their rims or edges hemmed with solder strips will greatly facilitate the operation of closing or soldering filled cans, as such caps may be applied to the can as easily and quickly as an ordinary cap, thus saving the time and labor of separately applying the solder; and owing to the even distribution of the solder over the joint and to the thin-strip form of the solder, it may be melted and the seam soldered more quickly and with a less degree of heat.

The thickness and width of the solder strip should be such as to furnish just the amount of solder required to properly solder the seam, and the flux $c$ should be also applied in just the necessary amount. If preferred, the flux may be separately applied at the time the soldering is done.

I do not herein claim, broadly, or independent of its combination with the can-cap, a continuous ring of sheet solder, as such continuous ring forms the subject of another pending application filed by me.

I claim—

1. A sheet of metal of a round, square, or other desired form having a thin strip of sheet-solder of sufficient width and thickness for soldering the seam secured at or near its edge, substantially as specified.

2. A sheet of metal having a thin continuous strip of solder folded over its edge, substantially as specified.

3. A can-cap having its rim or edge hemmed with a thin strip of solder folded over such rim or edge, substantially as specified.

4. A can cap or head having a thin continuous ring of solder folded over its rim or edge, substantially as specified.

5. A can-cap having its rim or edge furnished with flux and a strip of solder folded over its edge and embracing the flux, substantially as specified.

EDWIN NORTON.

Witnesses:
 H. M. MUNDAY,
 EDMUND ADCOCK.